United States Patent
Knutson

(10) Patent No.: US 6,330,711 B1
(45) Date of Patent: Dec. 11, 2001

(54) METHOD AND APPARATUS FOR DYNAMIC APPLICATION AND MAINTENANCE OF PROGRAMS

(75) Inventor: James Knutson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/124,718

(22) Filed: Jul. 30, 1998

(51) Int. Cl.$^7$ .................................................. G06F 9/445
(52) U.S. Cl. ............................................................ 717/1
(58) Field of Search ................................ 395/701; 717/1, 717/3, 4, 5

(56) References Cited

U.S. PATENT DOCUMENTS

| | | | |
|---|---|---|---|
| 5,699,310 | * 12/1997 | Garloff et al. | 717/1 |
| 5,822,587 | * 10/1998 | McDonald et al. | 717/2 |
| 5,918,052 | * 6/1999 | Kruskal et al. | 717/1 |
| 5,933,144 | * 8/1999 | Alcorn | 345/347 |
| 6,002,874 | * 12/1999 | Bahrs et al. | 395/705 |
| 6,151,700 | * 11/2000 | Fox | 717/1 |
| 6,185,730 | * 2/2001 | LeBlanc | 717/1 |

OTHER PUBLICATIONS

LeBlanc, K.; "What is a Dippable JavaBean?". The IBM Developer Connection News, Rel 2, vol. 1, Mar. 1998.*
Johnson, D.; "Charles Schwab and IBM's BeanExtender". IBM Software Solutions Division[online].Accessed on Jan. 14, 2000. Retrieved from the Internet: http://review.software.ibm.com/developer/library, Mar. 1998.*
Apte et al.; "Java Beans In, Java Beans Out". IBM Software Solutions Division[online]. Accessed on Jan. 14, 2000. Retrieved from the Internet: http://review.software.ibm-.com/developer/library, Mar. 1998.*
Fox, O.; "Using BeanExtender's Dipping Technique". IBM Software Solutions Division[online]. Accessed on Jan. 14, 2000. Retrieved from the Internet: http://review.software.ibm.com/developer/library, Mar. 1998.*
Rein et al.; "The Grand Challenge: Building Evolutionary Technologies". IEEE/IEE Electronic Library[online]. Proceedings of the Twenty–Sixth Hawaii International Conference on System Sciences, vol. 4, pp. 23–31, Jan. 1993.*
Hamilton, G.; "JavaBeans API Specification, Version 1.01". Sun Microsystems Website. Accessed on Jan. 14, 2000. Retrieved from the Internet: http://www.sun.com, Mar. 1998.*

* cited by examiner

*Primary Examiner*—Mark R. Powell
*Assistant Examiner*—Kelvin Booker
(74) *Attorney, Agent, or Firm*—David A. Mims, Jr.; Duke W. Yee; Stephen J. Walder, Jr.

(57) ABSTRACT

A method and apparatus providing a data processing system for managing rules in a program in a Java operating system. The program is morphed such that the program becomes a dippable program. A rule change is identified for the program. A dip is created for the program, wherein the dip incorporates the rule change. The dip is added to the dippable program, wherein the rule change is incorporated into the dippable program. In the instance in which the program is not in a form suitable for morphing, an interface may be added to encapsulate the program and allow the program to be compatible with Java objects.

16 Claims, 3 Drawing Sheets

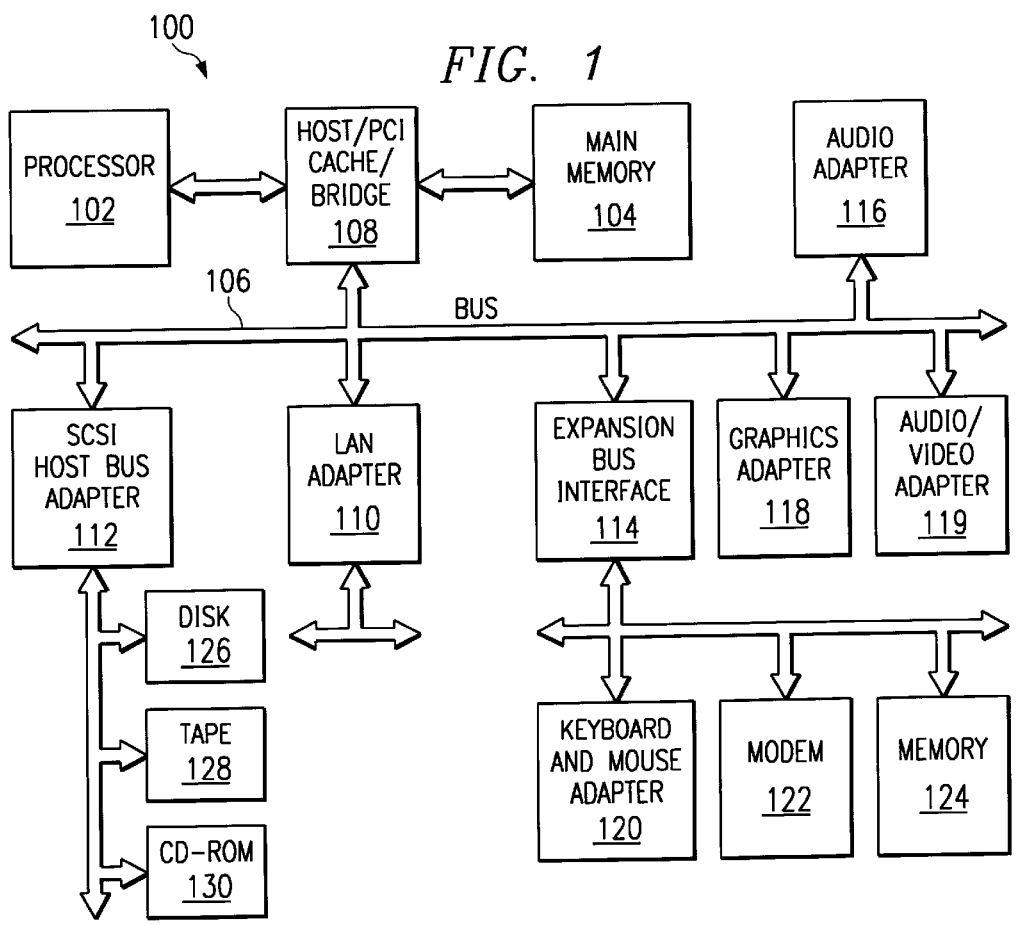
FIG. 1
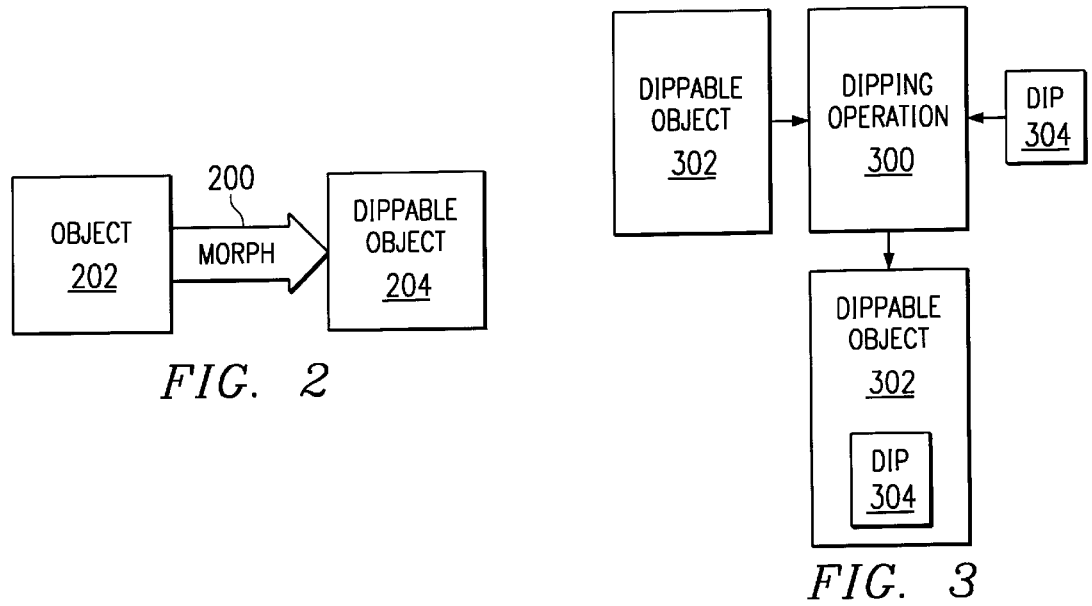
FIG. 2
FIG. 3

METHOD AND APPARATUS FOR DYNAMIC APPLICATION AND MAINTENANCE OF PROGRAMS

BACKGROUND OF THE INVENTION

1. Technical Field

The present invention relates to an improved data processing system and in particular to object-oriented programming systems. Still more particularly, the present invention relates to a method and apparatus for dynamically maintaining programs.

2. Description of Related Art

A computer includes both a physical machine, namely the hardware, and the instructions which cause the physical machine to operate, namely the software. Software includes both application and operating system programs. If the program is simply to do tasks for a user, such as solving specific problems, it is referred to as application software. If a program controls the hardware of the computer and the execution of the application programs, it is called operating system software. System software further includes the operating system, the program that controls the actual computer or central processing unit (CPU), and device drivers that control the input and output devices (I/O) such as printers and terminals.

A number of application programs are usually present waiting to use the CPU. The operating system determines which program will run next, how much of the CPU time it will be allowed to use, and what other computer resources the application will be allowed to access and use. Further, each application program will require a special input or output device and the application program must transfer its data to the operating system, which controls the device drivers.

A network containing a number of computers may be formed by having these computers, also referred to as "nodes" or "network computers", communicate with each other over one or more communications links, which is an aggregation which is a computer network. Today, many computer workstations are connected to other workstations, file servers, or other resources in a network. Each computer on a network is connected to the network via an adapter card or other similar means, which provides an ability to establish a communications link to the network.

Many types of programs are presently available in both a stand alone form and from a server in a network that employ various rules for decision making. Presently, many of these types of programs require maintenance of legacy code in languages that may not be current. For example, a company may have a program written in COBOL that are available to users though client computers to select airline flights for travel. At some time, the company may desire to limit it selection of flights to those flights that are direct flights that cost no more than $100.00 more than the cheapest connecting flight. Such a change requires the use of a programmer who is versed in COBOL to make the needed changes. As such programmers become scarcer, the cost of maintenance of such a program increases.

Therefore, it would be advantageous to have an improved method and apparatus for applying changes to programs in a language independent manner.

SUMMARY OF THE INVENTION

The present invention provides a method and a data processing system for managing rules in a program in a Java programming system. The program is morphed such that the program becomes a dippable program. A rule change is identified for the program. A dip is created for the program, wherein the dip incorporates the rule change. The dip is added to the dippable program, wherein the rule change is incorporated into the dippable program. In the instance in which the program is not in a form suitable for morphing, an interface may be added to encapsulate the program and allow the program to be compatible with Java objects.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a block diagram of a data processing system in which the present invention may be implemented;

FIG. 2 is a diagram of morphing operation in accordance with a preferred embodiment of the present invention;

FIG. 3 is a diagram of a dipping operation in accordance with a preferred embodiment of the present invention;

DETAILED DESCRIPTION OF THE PREFERRED EMBODIMENT

Figure 4:
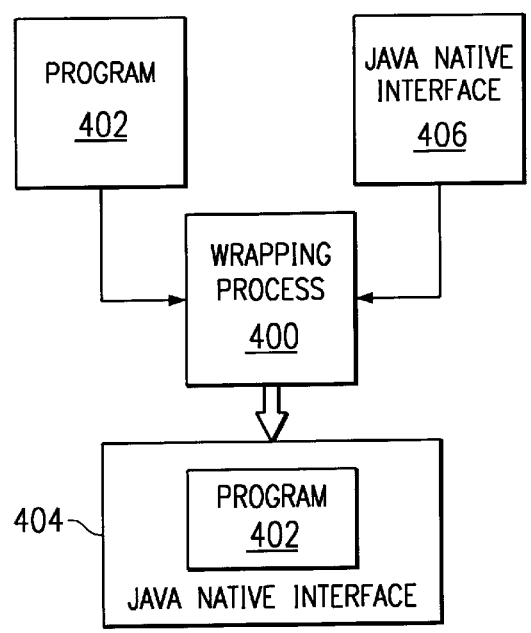
FIG. 4 is a diagram of a process for providing an interface to a non-object oriented program in accordance with a preferred embodiment of the present invention.

With reference now to the figures and in particular with reference to FIG. 1, a block diagram of a data processing system 100 in which the present invention may be implemented is illustrated. Data processing system 100 may be used either as a server or a computer. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of from International Business Machines Corporation. An object oriented programming system such as Java may run in conjunction with the operating system and provides calls to the operating system from Java programs or applications executing on data processing system 100. Instructions for the operating system, the object-oriented operating system, and applications or programs may be located on storage devices, such as hard disk drive 126 and may be loaded into main memory 104 for execution by processor 102

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. The depicted example is not meant to imply architectural limitations with respect to the present invention. For example, the processes of the present invention may be applied to a multiprocessor data processing system.

The present invention provides a method, data processing system, and instructions for dynamically maintaining programs. In a preferred embodiment of the present invention, the processes may be applied to programs written in non-current programming languages, such as COBOL. Dynamic changes to such programs may be made by creating an interface for the program to make the program compatible with a object-oriented programming system, such as Java. The program may then be modified to be "dippable" to allow for dynamic changes. In this manner, the processes of the present invention may be used to dynamically apply and maintain various logic, such as business rules in existing programs or applications.

In the depicted examples, the processes of the present invention are implemented using the Java programming system, which is an object oriented programming system. Object-oriented programming techniques involve the definition, creation, use, and instruction of "objects". These objects are software entities comprising data elements or attributes and methods, which manipulate data elements. Objects also may include data related to events outside of the object to trigger or control methods within the object.

Objects are defined by defining "classes", which are not objects, but templates, which instruct a compiler how to construct the actual object. For example, a class may specify the number and type of data variables and the steps involved in the functions, which manipulate data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related methods are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an object may have format of attribute data and methods to support a geometric shape. The same format can be used whether the shape is a rectangle or a circle. However, the actual program code which performs the shape formation may differ widely depending on the type of variables which comprise the shape. After the methods have been defined, a program can later refer to the shape formation method by its common format and, during compilation, the compiler will determine which of the shaping methods to be used by examining the variable types. The compiler will then substitute the proper function code.

A third property of object oriented programming is inheritance which allows program developers to reuse preexisting programs. Inheritance allows a software developer to define classes and the object which are later created from them as related through a class hierarchy. Specifically, classes may be designated as subclasses of other basic classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

A set of predefined, interconnected classes are sometimes provided to create a set of objects and additional miscellaneous routines which are all directed to performing commonly encountered tasks in a particular environment. Such predefined classes are typically called "frameworks" and essentially provide a prefabricated structure as a basis for creating a working application program.

In object oriented programming such as the previously described Java system, a developer is provided a framework, containing a set of predefined interface objects. The framework contains predefined classes which can be used as base classes and a developer may accept and incorporate some of the objects into these base classes, or the developer may modify or override objects or combinations of objects in these base classes to extend the framework and create customized solutions in particular areas of expertise.

A clarification of the term "framework" as used in object-oriented programming is in order. Frameworks are predefined structures for objects, combinations of objects which form more extensive objects and eventually combinations which provide whole programs.

Frameworks are employed in which predefined, interconnected classes are organized to provide a structure that is the basis for creating a program. In Java, a framework is present that contains predefined classes used as base classes. Objects may be incorporated into these base classes or objects or combinations of objects.

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods.

The Java virtual machine (JVM) is a virtual computer component that resides in memory. In some cases, the JVM may be implemented in a processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures.

To enable a Java application to execute on different types of data processing systems, a compiler typically generates an architecture-neutral file format—the compiled code is executable on many processors, given the presence of the Java run-time system. The Java compiler generates bytecode instructions that are non-specific to a particular computer architecture. A bytecode is a machine independent code generated by the Java compiler and executed by a Java interpreter. A Java interpreter is a module in the JVM that alternately decodes and executes a bytecode or bytecodes. These bytecode instructions are designed to be easy to interpret on any computer and easily translated on the fly into native machine code.

With reference now to FIG. 2, a diagram of a morphing operation is depicted in accordance with a preferred embodiment of the present invention. A morphing operation is applied to object 202 to create a new dippable object 204. Dippable object 204 is object 202 with modifications that allow it to accept additional behavior in the form of a dip. A "dip" is a class that has an interface that allows the class to be used by a dippable object. In essence, dippable object 204 looks and behaves like object 202, but has the added ability to accept behavioral modification components. Object 202 may be a Java class, such as, for example, a flight reservation program used to select and make reservations for airline flights. Typically, the application is often split into client and server classes in which the class containing the business rules or logic are maintained on the server and the class containing the presentation logic is maintained on the client. The server class will be morphed, while the client class uses the morphed business logic because it looks and behaves the same. When the object is morphed through morphing operation 200, the object becomes a dippable object such that the rules or logic used in selecting flights and making reservations may be altered. Morphing results in a new class that looks and behaves like before, but has the function of accepting new behaviors in the form of dips. For example, new behavior may be added to the flight reservation program to select only direct flights that are no more than $100.00 or more than a connecting flight. The change in behavior involves adding one or more rules in the depicted example. In addition, the change in behavior also may involve or change an existing rule within the class. These changes are implemented using dips as will be described in more detail below. A business rule defines how to run a business process. Businesses will define rules for operating the business. In the depicted example regarding flight reservation program, a decision was made that no flights can be taken if a direct flight costs $100.00 more than a connecting flight. Typically, implementation of business rules tend to show up in accounting systems and other places, which check to see if the rules of a business process are being followed. In the depicted example, the travel department for the business has modified the flight reservation system to enforce current business rules.

Turning now for FIG. 3, a diagram of a dipping operation is depicted in accordance with a preferred embodiment of the present invention. After an object has been made dippable, behavior modifications may be made using dipping operation 300. Dipping operation 300 uses dippable object 302 and dip 304 as inputs to attach dip 304 to dippable object 302. A dip is an implementation of a dip interface (a class), which allows the class to perform two things: (1) a dip allows an instance of a class which implements the dip interface to be associated with (attached to) an instance of a dippable class, and (2) a dip allows an instance of the class which implements the dip interface, which has been associated with an instance of a dippable class, to modify the behavior of an instance of the dippable class. Dipping is the operation, which associates an instance of the dip class with an instance of a dippable class. Dip 304 encapsulates behavior that is to be added to dippable object 302. In addition, dip 304 controls dippable object 302 with respect to the added behavior. For example, with a flight selection program that has been morphed to be dippable, a dip in the form of a rule for selection of direct flights may be added to modify the behavior or the flight selection program without having to modify the code or instructions for the flight selection program.

Morphing and dipping are both used to modify a program to add or modify behavior of the object. In addition, added or modified behavior may be easily removed at a later time by removing the dip. For example, if direct flights that are no more that $100.00 above the cost of a connecting flight are no longer a requirement, the dip for that rule may be removed. If the price differential is to be no more than $300.00, the old dip may be removed and a new dip containing the new limit may be added to the flight reservation program. Alternatively, the existing dip may be customized to change a property, which represents the price differential without removing and reapplying the dip. In addition, new dips may be added to the object. For example, a new business rule temporarily restricting use of a particular airline due to terrorists threats could be implemented as a dip to add a new business rule in conjunction with the existing rule regarding price differentials. In this manner, the original object does not need to be modified in order to change the behavior. The addition and/or removal of dips allows for the desired flexibility.

Morphing is a means by which an existing class is examined and duplicated as a subclass such that all methods, events, and properties of the original class can have "before" and "after" notifications performed. In addition, any "before" notification can also veto the execution of the method, property, or event. This mechanism is handled by applying a dip to the subclass resulting from the morphing. The dip then uses the "before" and "after" notifications to modify the behavior of the subclass and therefore the original class. The combined subclass and dip(s) are then saved as a single component. More information on morphing and dipping objects are found in assignee's co-pending U.S. Patent Application entitled "An Object Oriented Programming System With Objects For Dynamically Connecting Functioning Programming Objects With Objects For General Purpose Operation", LeBlanc et al., Attorney Docket AT9-97-359, Ser. No. 08/953,345, filed Oct. 17, 1997, which is incorporated herein by reference. In this application, "morphing" is described as a process for creating hooks in a connecting object which fires events to notify interested object. Morphing is the means by which an original general purpose Bean is extended using a connecting layer to hook the original Bean's property changes, event generation, and method calls and notify any interested context layer objects (dips) to produce a dippable general purpose Bean.

To begin, one must understand dips. Dips are beans (reusable software components) that react to state changes in dippable beans to which they are attached. Dippable beans are beans that have been run through a morphing tool, in which the bean is wrapped with an API, so that dips can be applied. Dips modify the runtime behavior of the beans to which they are attached, but they do not provide new interfaces on beans to which they are attached. Dips are attached through the EventListener model. This one-way communication mechanism, while limiting, can be used to add behaviors to a dippable bean. However, if the original bean was thread safe, its dippable version remains thread safe. If the original bean was immutable, the original bean part of the dippable bean remains immutable. The original bean part is what is visible to the clients of the bean. Though dips can add behavior, they cannot add new properties, events, or methods to the bean.

The dipping framework allows the user to take an existing Java class and produce a new class to which dips can be applied. This can be done in one of the following ways: (1) take an existing class and create a new dippable class as a child of the original, parent class; and (2) take an interface and a corresponding implementation class and create a new dippable class that implements the interface and uses the implementation class.

In each case, the new dippable class implements the dippable interface. If desired, the new dippable class could implement the dippable extended interface, which is a child of the dippable interface. Therefore, all dippable classes, even those implementing the dippable extended interface, are implementations of the dippable interface.

During the creation of a new dippable class, dips can be added to the class definition of the dippable bean. Because dips can be added to an instance of a dippable bean, instances of the same class can have different behaviors applied to them through the dipping process. The dipping concept creates a step between development and deployment for Java applications. This step allows new behaviors to be added to existing binary objects.

A dippable bean allows dips to intercept properties, methods, and events. All set<PropertyName> ()(1) methods are treated as property-related. All fire<EventName> () or process<EventName> ()methods are treated as event-related.

The dipping framework works outside of a beans' environment and works on any Java class that follows the Java beans naming strategy.

With reference now to FIG. 4, a diagram of a process for providing an interface to a non-object oriented program is depicted in accordance with a preferred embodiment of the present invention. Wrapping process 400 is employed to turn program 402 into a Java compatible object 404 using Java native interface 406. A Java native interface is a native programming interface that allows Java code that runs inside a Java virtual machine to interoperate with applications and libraries written in other programming languages, such as C, C++ and assembly. Program 402, in the depicted example, is in a language, such as COBOL, which is not usable in the morphing process described above. Wrapping and layering are ways of changing an interface to a programming system. In the depicted example, the interface from a procedural system, possibly implemented in COBOL, is changed to an object-oriented interface implemented in Java. Wrapping tends to be associated object-oriented system in which a wrapper overrides the behavior of an existing object and layering tends to be used in procedural systems although they both perform similar functions (i.e., change the interface). Wrapping process 400 encapsulates program 402 in a wrapper, which provides a new interface from the underlying system, program 402. The implementation of the wrapper in the depicted example, uses Java native interface 406 to generate calls to the underlying program. In the depicted example, Java native interface 406 is like a layer on top of a procedural base system. With Java native interface 406, program 402 forms an object that can be morphed in accordance with a preferred embodiment of the present invention. Java native interface 406 is used to translate messages from other Java objects or components into calls used by program 402 and to translate responses from program 402 into messages that are recognized by Java objects or components. In addition, wrapping may be applied to other systems, such as, for example, Data Base Management System (DBMS) or a rule based system.

Figure 5:
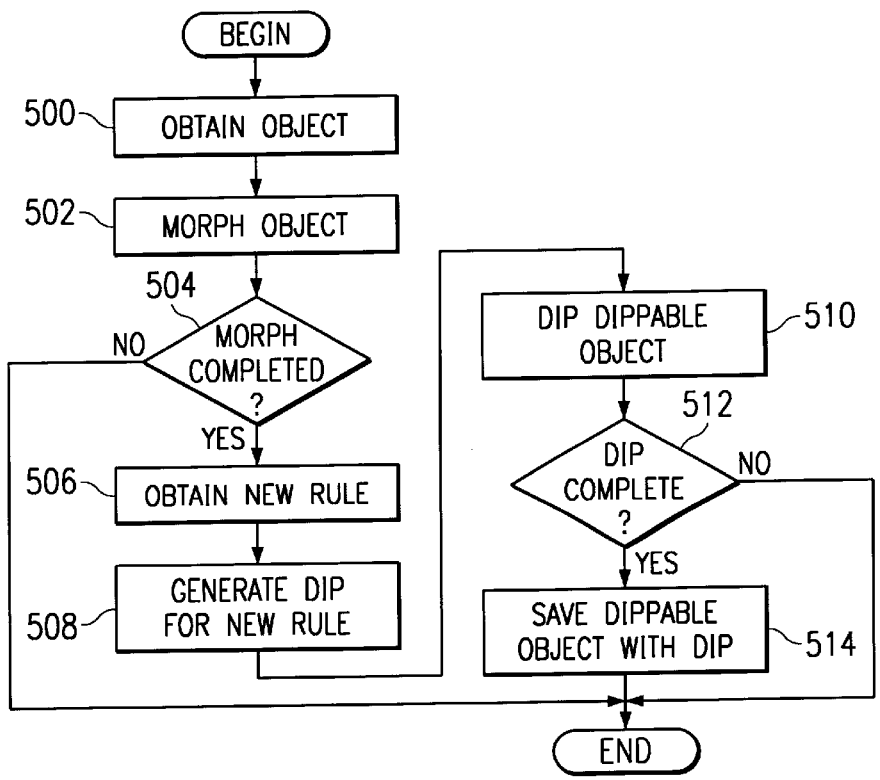
FIG. 5 is a flowchart of a process for adding rules to an object in accordance with a preferred embodiment of the present invention.

With reference now to FIG. 5, a flowchart of a process for adding rules to an object is depicted in accordance with a preferred embodiment of the present invention. The process in FIG. 5 is applied to create a dippable object from a Java object and to add a rule to the object. The process begins by obtaining an object for which a rule is to be added (step 500). Next, the object is morphed (step 502). A determination is made as to whether the morphing process was successfully completed (step 504). If the process was not successful, the process terminates. If the morphing process is successful, a dippable object has been produced. Then, a new rule that is to be added to the object is obtained (step 506). A dip is generated for the new rule (step 508). For example, the business logic of a CICS application may have an object oriented Java wrapper class which exposes the business logic of the CICS application as methods which have return values and take arguments, but their implementation is delegated to the CICS application using a layer of software such as a Java native interface. CICS is a known transactional programming system.

In addition, it is assumed in this example that the implementation of this Java wrapper class has been morphed and that new business rules are implemented as dips which are dynamically attached to the Java wrapper class. The CICS application may be a COBOL program, the Java wrapper class is Java and the dips may be Java or another language such as Netrexx (a simple scripting language).

When business logic is no longer needed or is desired to be temporarily inhibited, a business rule dip can be written to do the following: (1) when it is dipped onto the morphed Java wrapper class, it registers an interest in being notified of an attempt to use the obsolete business logic; and (2) when notified, it prevents the execution of the business logic by throwing a veto exception which tells the dipping framework to not call the business logic.

In the depicted example, two ways exist to modify the behavior of existing business logic using a business rule dip. One is to change its input, while the other is to modify its output.

Modifying existing business logic by changing the input is accomplished by the following: (1) when the business rule is dipped onto the morphed Java wrapper class, it registers an interest in being notified in an attempt to use the business logic which needs to be modified; and (2) when notified, it examines the input parameters to the method, modifies them to fit the new business rule, and then lets the execution of the existing business logic continue. A call is made to a method to run some business logic in a dippable class that has a dip attached to it. The dip intercepts that call and looks at the arguments and properties (the input to the method on the dippable class). The dip then modifies the arguments and properties to fit the new business rule and lets the intercepted method call with the new argument and property values proceed.

The output of the business logic can be modified by registering for notification as above but this time it registers to be notified after the business logic has completed. A call is made to a method to run some business logic in a dippable class that has a dip attached to it. The dip intercepts the completion of the business logic (the return) and examines the return value, and any output arguments and/or properties. The dip then modifies the return value and/or output arguments and properties of the dippable class to fit the new business rule. The return then completes.

When notified, the business rule can examine and optionally modify the output of the business rule. This can include both return values and the actual content of the data attributes of the Java wrapper class.

The dippable object is dipped (step 510) with the new business rule dip. Next, a determination is made as to whether the dipping process was successfully completed (step 512). If the dipping process was not successfully completed, the process terminates. Successful completion of the dipping process results in saving of the dippable object with the dip (step 514) with the process terminating thereafter.

Figure 6:
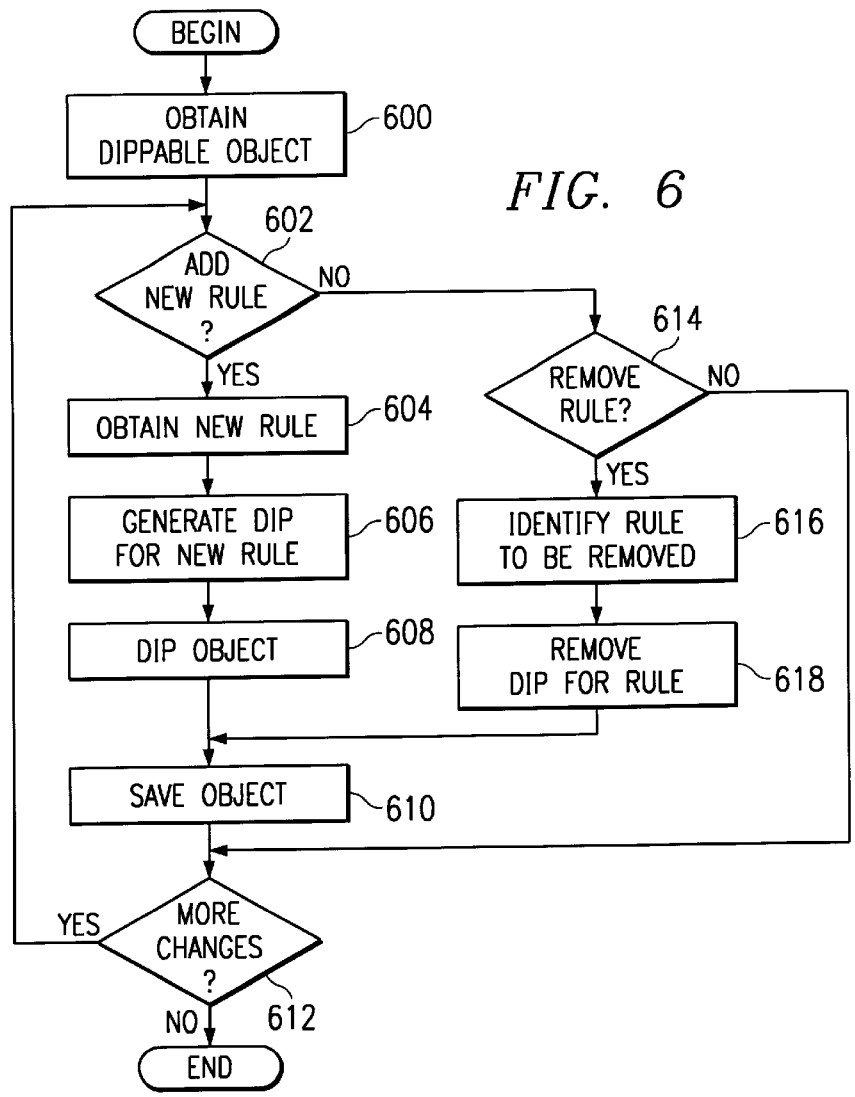
FIG. 6 is a flowchart of a process for adding and removing rules from a dippable object in accordance with a preferred embodiment of the present invention.

Turning next to FIG. 6, a flowchart of a process for adding and removing rules from a dippable object is depicted in accordance with a preferred embodiment of the present invention. This process may be applied to dippable objects with and without dips. The process begins by obtaining the dippable object that is to have its behavior modified (step 600). A determination is made as to whether a new rule is to be added to the dippable object (step 602). If a new rule is to be added, the new rule is then obtained (step 604), and a dip is generated for the new rule (step 606). Thereafter, the dippable object is dipped using the dip generated for the new rule (step 608). The modified dippable object with the new dip is then saved (step 610). A determination is then made as to whether more changes are to be made to the dippable object (step 612). If more changes are to be made, the process then returns to step 602. Otherwise the process terminates.

With reference again to step 602, if a new rule is not to be added, a determination is made as to whether a rule is to be removed (step 614). If a rule is not to be removed, the process then proceeds to step 612 as previously discussed. Otherwise, the rule to be removed is identified (step 616). The dip for the rule to be removed is then removed from the object (step 618). Then the process proceeds to step 610 to save the object.

Figure 7:
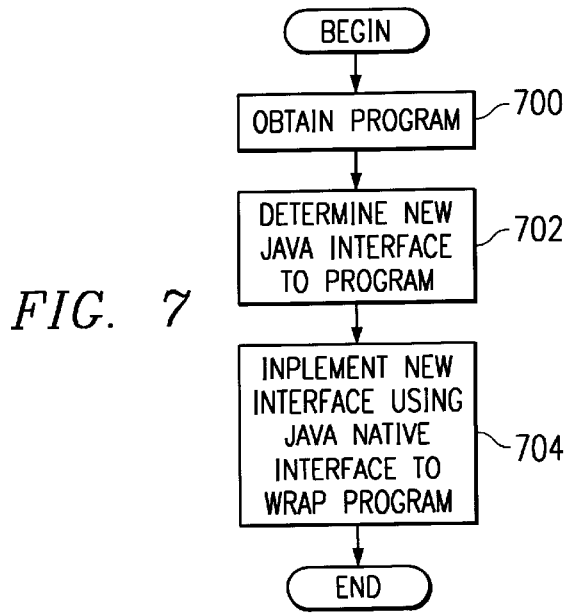
FIG. 7 is a flowchart of a process to create an object oriented representation of a program in accordance with a preferred embodiment of the present invention.

Turning next to FIG. 7, a flowchart of a process to create an object oriented representation of a program is depicted in accordance with a preferred embodiment of the present invention. This process is employed when a program is to have rules changed and is not compatible with the morphing process. This process is used to create a Java object using a wrapping process. The process begins by obtaining the program to be modified (step 700). The program to be modified may be for example, a COBOL program or a non-Java object. The process then determines a new Java interface to program (step 702). An implementation (a class) of the Java interface is created (step 704) which may use a Java native interface to execute the program's function. The Java class uses the Java native interface to generate calls or messages in a form recognized by the program in response to receiving messages from a Java object. The Java native interface used by the class can also create response recognized by Java objects when responses are generated by the program. This implementation class allows a morphable Java class to be created, which can communicate with or execute the function of the program to create a Java object that can be morphed.

Thus, the present invention provides an improved method and apparatus for applying and maintaining rules in applications. This advantage is provided through morphing a Java object to create a dippable object and modifying the rules employed by the object by adding a dip. Non Java objects or programs can be modified by adding an interface that allows the objects or programs to be modified using dips.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing a set of business rules in a program, the method comprising the data processing system implemented steps of:
   morphing the program, wherein the program becomes a dippable program;
   identifying a rule change within the set of business rules for the program;
   creating a dip for the program, wherein the dip incorporates the rule change; and
   adding the dip to the dippable program, wherein the rule change is incorporated into the set of rules for the dippable program.

2. The method of claim 1, wherein the program is incompatible with the morphing step and further comprising:
   connecting the program to an interface, wherein the interface provides for translation of calls between the program and a Java programming system.

3. The method of claim 1, wherein the program comprises a plurality of beans.

4. A method in a data processing system for managing a set of business rules in a program, wherein the program is a flight selection program, the method comprising the data processing system implemented steps of:

morphing the program, wherein the program becomes a dippable program;

identifying a rule change within the set of business rules for the program;

creating a dip for the program, wherein the dip incorporates the rule change; and adding the dip to the dippable program, wherein the rule change is incorporated into the set of rules for the dippable program.

5. A method in a data processing system for managing a set of business rules in a program, wherein the program is incompatible with morphing, wherein the program is written in COBOL, the method comprising:

connecting the program to an interface, wherein the interface provides for translation of calls between the program and a Java programming system to form a compatible program;

morphing the compatible program, wherein the program becomes a dippable program;

identifying a rule change within the set of business rules for the program;

creating a dip for the program, wherein the dip incorporates the rule change; and adding the dip to the dippable program, wherein the rule change is incorporated into the set of rules for the dippable program.

6. The method of claim 1, wherein the dippable program includes a plurality of rules implemented as a plurality of dips and further comprising:

identifying a rule that is an invalid rule;

identifying a dip within the plurality of dips that incorporates the invalid rule; and removing the dip that incorporates the invalid rule.

7. A data processing system for managing rules in a program in a Java programming system, the data processing system comprising:

morphing means for morphing the program, wherein the program becomes a dippable program;

identification means for identifying a rule change within the set of business rules for the program;

creation means for creating a dip for the program, wherein the dip incorporates the rule change; and adding means for adding the dip to the program, wherein the rule change is incorporated into the set of rules for the dippable program.

8. The data processing system of claim 7 further comprising:

connecting means, responsive to the program being incompatible with the first instructions for morphing, for connecting the program to an interface prior to morphing the program using the morphing means, wherein the interface provides for translation of calls between the program and the Java programming system, and wherein the interface provides for translation of calls between the program and the Java programming system, wherein the interface is in a Java class that can be morphed by the morphing means.

9. The data processing system of claim 7, wherein the program comprises a plurality of beans.

10. A data processing system for managing rules in a program in a Java programming system, wherein the program is a flight reservation program, the data processing system comprising:

morphing means for morphing the program, wherein the program becomes a dippable program;

identification means for identifying a rule change within the set of business rules for the program;

creation means for creating a dip for the program, wherein the dip incorporates the rule change; and adding means for adding the dip to the program, wherein the rule change is incorporated into the set of rules for the dippable program.

11. A data processing system for managing rules in a program in a Java programming system, wherein the program is written in COBOL, the data processing system comprising:

connecting means, responsive to the program being incompatible with the first instructions for morphing, for connecting the program to an interface prior to morphing the program using the morphing means, wherein the interface provides for translation of calls between the program and the Java programming system, and wherein the interface provides for translation of calls between the program and the Java programming system, wherein the interface is in a Java class that can be morphed by a morphing means;

morphing means for morphing the program, wherein the program becomes a dippable program;

identification means for identifying a rule change within the set of business rules for the program;

creation means for creating a dip for the program, wherein the dip incorporates the rule change; and adding means for adding the dip to the program, wherein the rule change is incorporated into the set of rules for the dippable program.

12. A computer program product for managing a set of business rules in a program, comprising:

a computer readable medium;

first instructions for morphing the program, wherein the program becomes a dippable program;

second instructions for identifying a rule change within the set of business rules for the program;

third instructions for creating a dip for the program, wherein the dip incorporates the rule change; and fourth instructions for adding the dip to the program, wherein the rule change is incorporated into the set of rules for the dippable program, wherein the instructions are embodied within the computer readable medium.

13. The computer program product of claim 12, wherein the program is incompatible with the first instructions for morphing and further comprising:

fifth instructions, responsive to the program being incompatible with the first instructions for morphing, for connecting the program to an interface prior to executing the first instructions for morphing to the program, wherein the interface provides for translation of calls between the program and a Java programming system.

14. The computer program product of claim 12, wherein the computer readable medium is a CD-ROM.

15. The computer program product of claim 12, wherein the computer readable medium is a random access memory.

16. The computer program product of claim 13, wherein the computer readable medium is a communications link.

* * * * *